G. A. FULLIPS.
MECHANICAL MOVEMENT.
APPLICATION FILED MAY 14, 1921.

1,419,368.

Patented June 13, 1922.
2 SHEETS—SHEET 1.

INVENTOR.
George A. Fullips
BY
Erwin Wheeler & Willard
ATTORNEYS.

G. A. FULLIPS.
MECHANICAL MOVEMENT.
APPLICATION FILED MAY 14, 1921.
1,419,368.
Patented June 13, 1922.
2 SHEETS—SHEET 2.
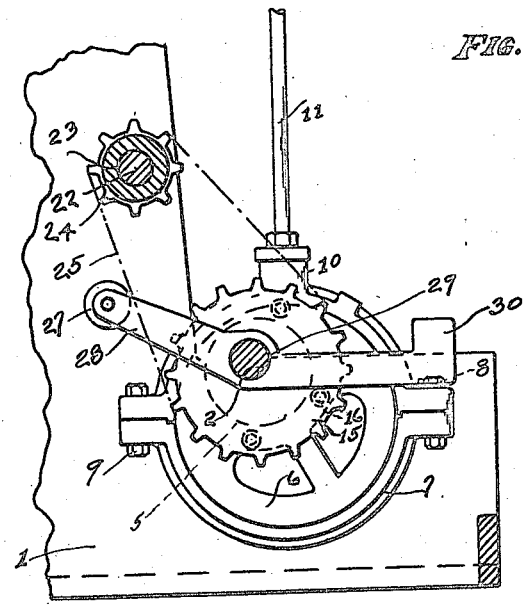
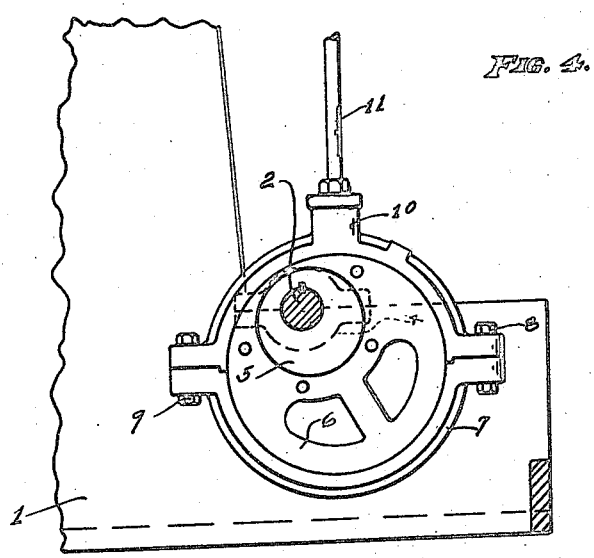
INVENTOR.
George A. Fullips
BY
Erwin Wheeler & Woolard
ATTORNEYS.

UNITED STATES PATENT OFFICE.

GEORGE A. FULLIPS, OF MILWAUKEE, WISCONSIN.

MECHANICAL MOVEMENT.

1,419,368.   Specification of Letters Patent.   Patented June 13, 1922.

Application filed May 14, 1921. Serial No. 469,606.

*To all whom it may concern:*

Be it known that I, GEORGE A. FULLIPS, a citizen of the United States, residing at Milwaukee, county of Milwaukee, and State of Wisconsin, have invented new and useful Improvements in Mechanical Movements, of which the following is a specification.

This invention relates to improvements in mechanical movements.

The object of this invention is to provide means for converting rotary motion to a reciprocatory motion having cyclic variations in length of stroke.

More specifically, it is the object of this invention to provide means for imparting to a reciprocatory member the combined effect of two eccentrics rotating at different speeds so that the motion of one eccentric will at first oppose and then be added to the motion of the other to cause the length of stroke of the reciprocating member to vary in a predetermined cycle.

It is a further object of this invention to provide a mechanism which can be made to produce any desired cycle of variations from pure harmonic motion in the reciprocatory member.

In the drawings:

Fig. 3 is a section taken on the line 2—2 of Fig. 1.

Fig. 4 is a section taken on line 3—3 of Fig. 1.

Like parts are identified by the same reference characters throughout the several views.

Figure 1:
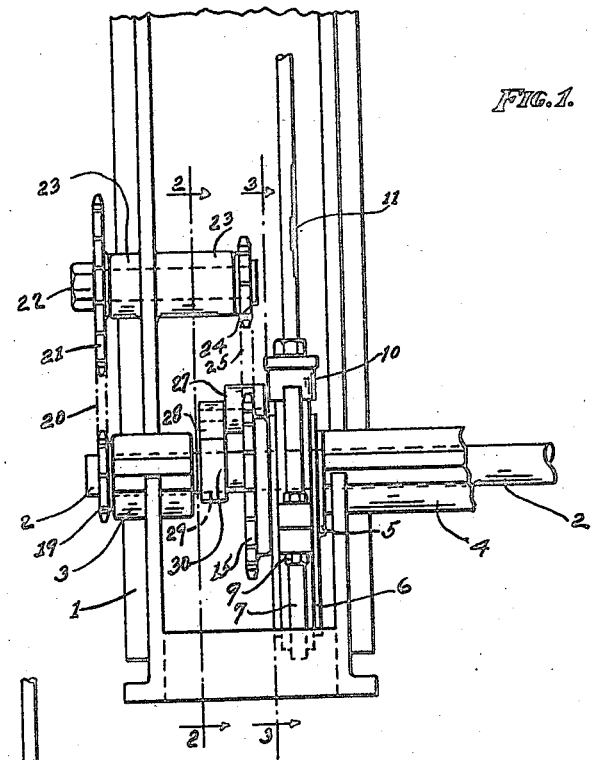
Fig. 1 is a front elevation of a mechanism embodying this invention.
Figure 2:
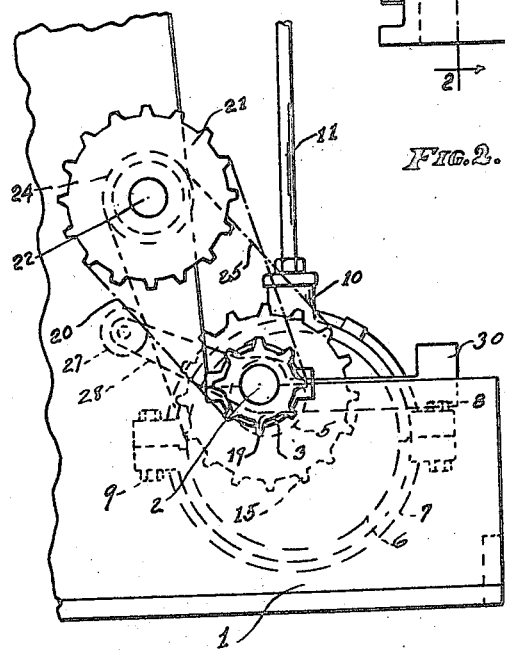
Fig. 2 is an end elevation of the same.

It is desired to protect the mechanical movement herein shown without reference to any particular machine with which it may be adapted to be used. In the drawings forming a part of this specification, the mechanism embodying this invention is shown mounted upon a machine frame 1 which may be a part of the frame of a valve grinding machine such as is shown and described in my copending application executed May 2, 1921. When used in connection with a valve grinding machine such as the one covered by the copending application above referred to, this mechanism is capable of imparting to the valve a reciprocatory rotative movement which will start with a rotation through a few degrees and will be gradually increased to a rotation of one or more complete turns and will then decrease back to the few degrees of rotation with which the reciprocatory motion was begun. This change will be made in cycles which will be completed periodically.

The power shaft with which the device of this invention is associated is shown at 2 and is journaled at 3 and 4 in the machine frame 1. Intermediate of bearings 3 and 4 is an eccentric 5 keyed to the shaft. A second eccentric 6 is journaled upon the outer or bearing face of the inner eccentric 5 and may be provided with any approved form of retaining flanges for securing it in position thereon. A split strap 7, made in two pieces which are joined together by bolts 8 and 9, is journaled upon the exterior bearing surface of the outer eccentric 6 and is provided at 10 with a threaded socket adapted to receive the pitman or reciprocatory member 11.

A sprocket wheel 15 is made fast by any suitable means such as screws 16 to one face of the external eccentric 6. It will be noted that this sprocket wheel is concentric with the axis about which the eccentric 6 revolves. The rotation of sprocket wheel 15 will cause the outer eccentric 6 to turn upon its bearing on the outer face of eccentric 5.

Fast to the shaft 2 at 19 is a sprocket wheel connected by a chain 20 with a wheel 21 which is carried by a jack shaft 22 journaled at 23 in a flange of the machine frame 1. At the opposite end of jack shaft 22 is another sprocket wheel 24. The chain 25 connects sprocket 24 with the larger sprocket 15 upon the external eccentric 6. The ratio between the teeth of the several sprockets will be determinative of the variation in movement of the reciprocatory member 11, as will be hereinafter explained.

It will be remembered that the outer eccentric 6 and the sprocket wheel 15 fast thereto are mounted for rotation upon an axis which is itself moving in an eccentric path. The axis of sprocket wheel 15 is therefore continuously approaching and receding from the axis of the idler shaft 22 whenever the shaft 2 is in rotation. This movement is comparatively slight in degree but would nevertheless cause chain 25 to slacken periodically if it were not for the provision of an idler pulley 27 carried by an arm 28 which is fulcrumed at 29 and counterweighted at 30 to maintain the chain under constant pressure.

The provision of the idler pulley, while preferred, is not necessary to the use of my invention since it would do no particular harm for most purposes to allow the chain 25 to become slack at each rotation of eccentric 5. But for valve grinding where a particularly steady motion is desired, it is advisable to use either the chain tightening mechanism illustrated or some equivalent device. For example, if shaft 22 is made to turn at the same speed as the main shaft 2, an eccentric sprocket may be used at 24 which will counteract the effect of eccentric 5.

From the foregoing description, it will be apparent that the eccentrics 5 and 6 are adapted to be continuously driven at different speeds from shaft 2, the eccentric 5 being mounted directly upon said shaft while the eccentric 6 is driven through sprocket wheels 19, 21, 24, and 15 and chains 20 and 25 in the same direction in which shaft 2 rotates but at a slower speed. Either eccentric is capable of imparting reciprocatory motion to the pitman or connecting rod 11. By reason of the fact that the outer eccentric 6 is mounted upon the eccentric 5, the effects of the two eccentrics will obviously be combined and since they turn at different rates of speed the combined effect must necessarily vary in a cycle, of which the characteristics will be determined by the difference in speed. At one point during the operation of the machine, the greatest radius of eccentric 5 will be separated by 180° from the greatest radius of eccentric 6. At this point, the reciprocatory motion of the pitman 11 will be at a minimum. At another point during the operation of the device, the greatest radii of the two eccentrics will be substantially superimposed so that the effect of eccentric 6 will be added to the effect of eccentric 5, thereby imparting to pitman 11 its greatest possible movement.

Those skilled in the art will realize that with each change in the speed of eccentric 6 relative to eccentric 5 a new cycle of movements will be imparted to the pitman. The pitman may therefore be given different reciprocatory movements suitable for many different purposes, merely by varying the number of teeth in the sprocket 15 relative to the number of teeth in sprocket 24.

I claim:

1. The combination with a rotatable shaft, of a disk eccentrically mounted thereon, a second disk eccentrically mounted upon the first, a reciprocatory member operatively connected to the seconk disk and adapted to receive the combined effect of both eccentrics, and means for driving the second eccentric independently of the first at a different rate of speed, the throw of the inner eccentric being smaller than the diameter of the shaft.

2. The combination with a power shaft, of an eccentric fast thereto, a second eccentric journaled on the exterior face of said first mentioned eccentric, and means for driving from the shaft the second eccentric.

3. The combination with a main shaft, of an eccentric thereon, a second eccentric journaled upon the first, a jack shaft driven from the main shaft, and driving connections between the jack shaft and the second eccentric, said connections being flexible, whereby the eccentric may be driven notwithstanding its bodily movement toward and from the jack shaft.

4. The combination with a main shaft, or an eccentric thereon, a second eccentric adapted to have rotation independent of the first but to be oscillated by said first eccentric, a jack shaft driven from the main shaft, driving connections between the jack shaft and the second eccentric, and means for compensating in said driving connections for the oscillations of the second eccentric produced by the first eccentric.

5. The combination with an eccentric and means for driving the same, of a second eccentric journaled thereon, means for driving the second eccentric at a rate of speed different from that at which said first mentioned eccentric is driven, and a strap associated with the second eccentric and adapted to receive the combined effect of both eccentrics.

6. The combination with a frame and a power shaft journaled therein, of an eccentric mounted upon said shaft, a second eccentric journaled for rotation upon the first, a sprocket wheel carried by said second eccentric concentric with its axis, a jack shaft carried by the machine frame, means for driving said shaft from the power shaft, and a sprocket carried by said jack shaft and connected by a chain with the sprocket upon said second eccentric.

7. The combination with an eccentric member having a circular exterior face, of a second eccentric journaled for rotation upon said exterior face, means for driving the first eccentric, means for driving the second eccentric at a different rate of speed, and a reciprocatory member adapted to receive the combined effect of the two eccentrics.

GEO. A. FULLIPS.